United States Patent
Huang et al.

(10) Patent No.: US 8,325,833 B2
(45) Date of Patent: Dec. 4, 2012

(54) INTERLACED SYMBOL CONSTELLATION MAPPING FOR WIRELESS COMMUNICATION

(75) Inventors: Rui Huang, Beijing (CN); Changlong Xu, Beijing (CN); Tom Harel, Shfaim, IL (US)

(73) Assignee: Intel Corporation, Santa Clara, CA (US)

( * ) Notice: Subject to any disclaimer, the term of this patent is extended or adjusted under 35 U.S.C. 154(b) by 536 days.

(21) Appl. No.: 12/642,936

(22) Filed: Dec. 21, 2009

(65) Prior Publication Data

US 2011/0150109 A1    Jun. 23, 2011

(51) Int. Cl.
*H04L 27/28* (2006.01)
*H04L 1/18* (2006.01)

(52) U.S. Cl. ........................................ 375/260; 714/749

(58) Field of Classification Search .................. 375/260, 375/295; 714/747–749
See application file for complete search history.

(56) References Cited

U.S. PATENT DOCUMENTS

| 2005/0152314 | A1* | 7/2005 | Sun et al. ........................ 370/334 |
| 2007/0036065 | A1* | 2/2007 | Wang ............................. 370/206 |
| 2007/0082696 | A1* | 4/2007 | Wang ........................... 455/550.1 |

* cited by examiner

*Primary Examiner* — Don N Vo
(74) *Attorney, Agent, or Firm* — Cool Patent, P.C.

(57) ABSTRACT

Briefly, in accordance with one or more embodiments, a data packet to be transmitted is encoded and one or more subpackets are generated from the encoded data packet. A first bit pattern is applied to a first symbol of the subpackets to provide a constellation, and a different bit pattern is applied to a next adjacent symbol in the constellation for one or more additional symbols. The data packet is then modulated according to the constellation and transmitted one or more times until the data packet is decoded by a receiver or until said transmitting is aborted according to a hybrid automatic repeat request error correction technique.

20 Claims, 8 Drawing Sheets

US 8,325,833 B2

INTERLACED SYMBOL CONSTELLATION MAPPING FOR WIRELESS COMMUNICATION

BACKGROUND

In wireless communication systems, hybrid automatic repeat request (HARQ) is utilized as an error-control method in which a data packet is repeatedly transmitted until the receiving device successfully decodes the packet. In some systems, the data packet may be subdivided into two or more subpackets transmitted at a varying code rate for each subpacket in order to help support HARQ transmission. In some HARQ processes, a retransmission bit may be mapped into the same layer of the constellation that is highly modulated, which may degrade decoding performance on the receiver side. In order to prevent retransmission bits from being allocated into the same level as the initial transmission bits, constellation rearrangement schemes may be employed in which the data bits may be rearranged from one transmission to the next transmission. However, with such schemes the adjacent bits in same transmission may still be mapped into the same constellation layer as a highly modulated data, which may impact the decoding performance on the receiver side.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
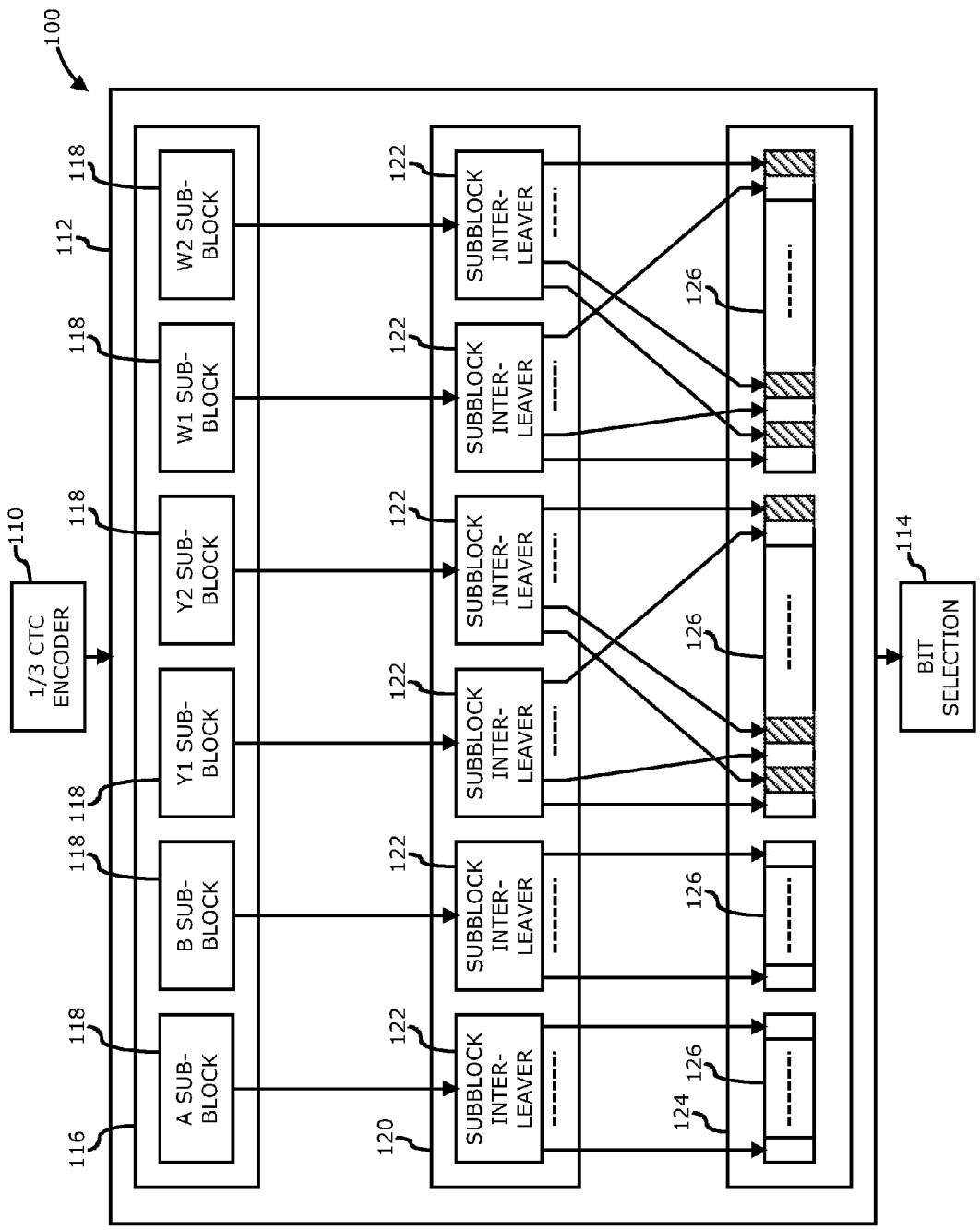
FIG. 1 is a block diagram of a channel coding circuit with subpacket generation in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a block diagram of a channel coding circuit with subpacket generation in accordance with one or more embodiments will be discussed. As shown in FIG. 1, a channel coding circuit 100 includes an encoder 110 to encode data to be transmitted to a receiving device. In one or more embodiments, encoder 110 may comprise a convolutional turbo code (CTC) encoder with a rate of 1/3 for example as specified in the Institute of Electrical and Electronics Engineers (IEEE) 802.16m standard, to perform channel coding. Encoder 110 provides coded data to a subpacket generation circuit 112 which comprises a bit separation circuit 116, a subblock interleaver circuit 120, and a bit grouping circuit 124. The output of subpacket generation circuit 112 is provided to a bit selection circuit 114. Bit separation circuit 116 separates the data coded by encoder 110 into two or more subblocks 118. The subblocks are then provided to corresponding subblock interleaver circuits 122 of subblock interleaver circuit to interleave the bits of the subblocks according to an interleaving scheme. The interleaved bits are then grouped into a symbol constellation comprising one or more symbol arrangements 126 at bit grouping circuit 124 for selection by bit selection circuit 114. In one or more embodiments, as will be discussed in detail below, channel coding circuit 100 may implement an interlaced symbol constellation scheme in which the modulation mapping rule is different for two adjacent symbols within the same transmission. Furthermore, for different HARQ transmissions, the pattern for a given symbol may be different for one or more retransmissions of the data. A block diagram of a constellation rearrangement scheme for HARQ is shown in and described with respect to FIG. 2, below.

Figure 2:
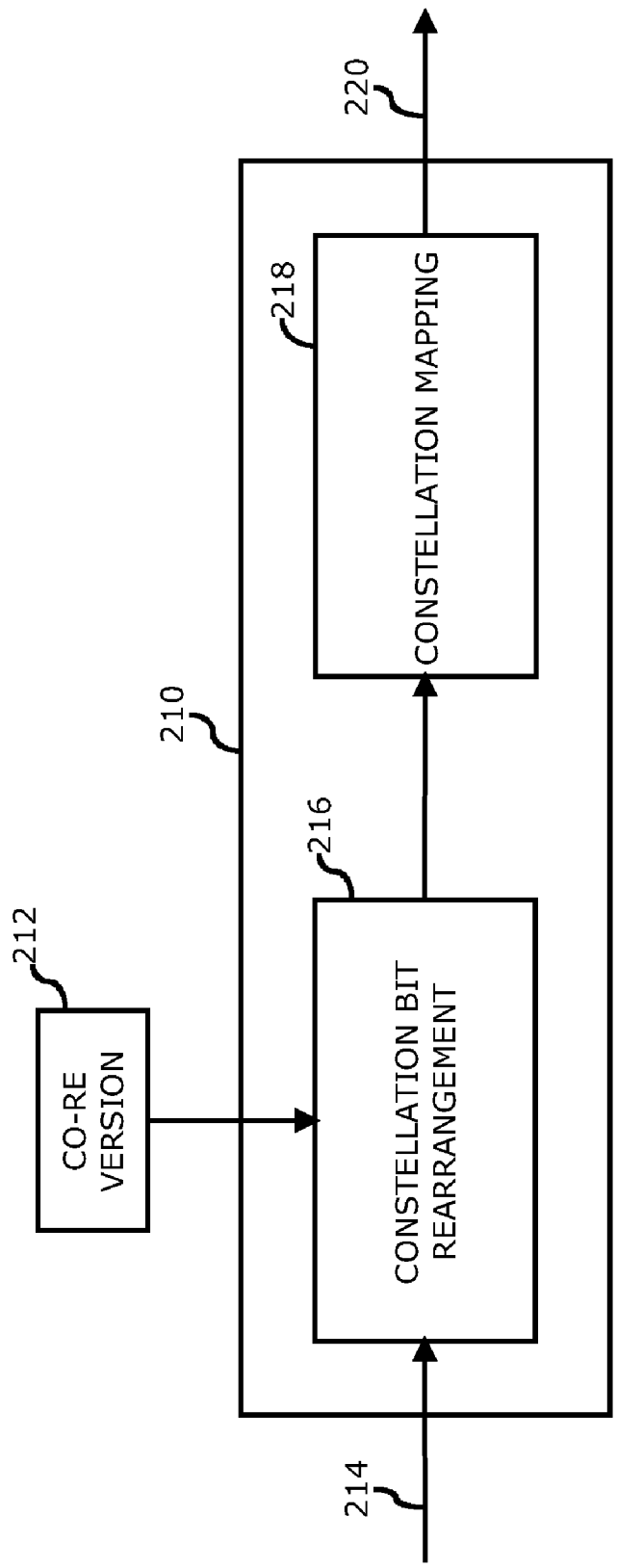
FIG. 2 is a block diagram of a constellation rearrangement scheme in accordance with one or more embodiments.

Referring now to FIG. 2, a block diagram of a constellation rearrangement scheme in accordance with one or more embodiments will be discussed. As shown in FIG. 2, a modulation circuit 210 receives data 214 to be modulated before transmission. The data 214 is provided to a constellation bit rearrangement circuit 216, which applies a particular constellation rearrangement scheme version 212 to rearrange one or more bits of the data 214. After bit rearrangement, the rearranged data 214 is provided to a constellation mapping circuit 218 to provide a symbol constellation 220 to be transmitted. In order to prevent the retransmission bits from being allocated into the same level as the initial transmission bits, the constellation rearrangement scheme 212 are provided to implement HARQ transmission as discussed in further detail below to achieve constellation rearrangement bit-grouping gain without increasing the complexity of channel coding circuit 100. For example, constellation rearrangement scheme 212 may involve swapping a most significant bit (MSB) of the data with a least significant bit (LSB), an inversion of a signaling bit (SB), exchanging in-phase data streams from one symbol to another, and so on. Furthermore, the bits may be interlaced to provide an interlaced symbol constellation scheme as shown in and described with respect to FIG. 3 and FIG. 4, below.

Figure 3:
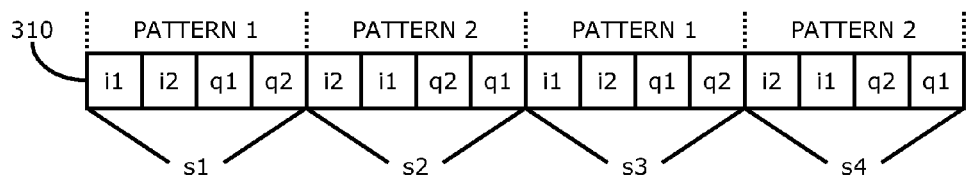
FIG. 3 is a diagram of an interlaced constellation symbol scheme for initial transmission and 16 QAM HARQ retransmission in accordance with one or more embodiments.
Figure 3:
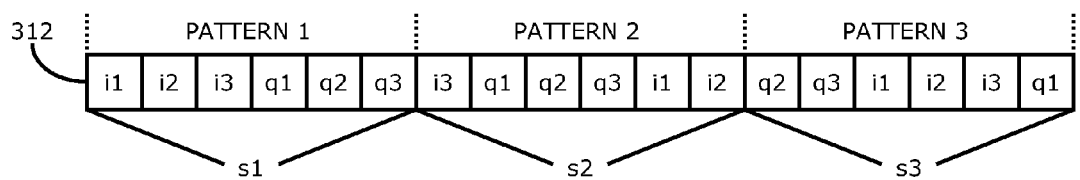
Figure 3:
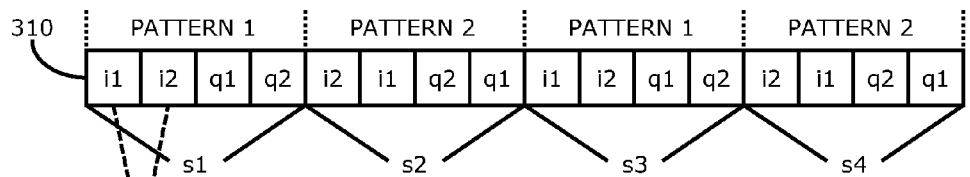
Figure 3:
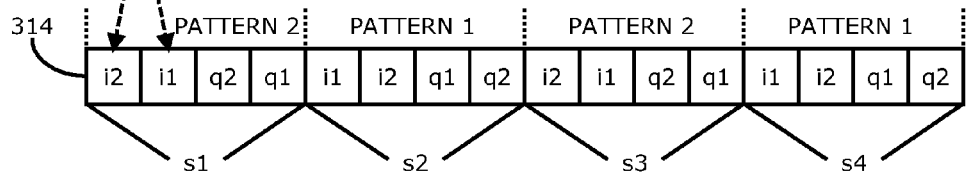

Referring now to FIG. 3, a diagram of an interlaced symbol constellation scheme at initial transmission and for 16 QAM HARQ retransmission in accordance with one or more embodiments will be discussed. An example initial symbol constellation 310 is shown for 16 quadrature amplitude modulation (16 QAM) modulation. Constellation 310 may comprise four symbols, s1, s2, s3, and s4, wherein each symbol comprises four bits for in-phase components i1 and i2 and quadrature components q1 and q2. As shown in FIG. 3, adjacent symbols are arranged to have a different pattern for the symbols respective bits. For example, two patterns may be utilized such that the first symbol, s1, has the bits arranged in a first pattern, pattern 1, and the next symbol, s2, has the bits arranged in a second pattern, pattern 2. The patterns may then be alternated such that any two adjacent symbols have a different pattern of bits.

Similarly, an example initial symbol constellation 312 is shown for 64 quadrature amplitude modulation (64 QAM) modulation. Constellation 312 may comprise three symbols, s1, s2, and s3, each comprising a pattern of six bits for in-phase components i1, i2, and i3, and quadrature components q1, q2, and q3. Constellation 312 follows the rule that adjacent symbols have different bit patterns. For example, using three patterns, the first symbol, s1, may have a first bit pattern, pattern 1, second symbol, s2, may have a second bit pattern, pattern 2, and third symbol, s3, may have a third bit pattern, pattern 3. The constellations 310 and 312 shown in FIG. 3 illustrate example arrangements of bits in a symbol constellation for an initial transmission of HARQ transmission. Other bit patterns and/or symbol arrangements may likewise be implemented that general follow the rule that adjacent symbols in a given transmission have different bit patterns, and the scope of the claimed subject matter is not limited in this respect.

To illustrate an interlaced symbol constellation rearrangement for HARQ transmission, constellation 310 represents an arrangement of bits for an initial 16 QAM transmission, and constellation 314 represents a subsequent arrangement of bits for the second transmission. As shown, bits i1 and i2 of symbol s1 are swapped from constellation 310 to constellation 314. Likewise, adjacent bits q1 and q2 are swapped from constellation 310 to constellation 314, and so on for the bits of the other symbols. In effect, this results in the bit pattern for symbol s1 to switch from pattern 1 to pattern 2, and the bit pattern for symbol s2 to switch from pattern 2 to pattern 1. In general, the symbol bit patterns are different for a given symbol are different from transmission to transmission, in addition to following the rule that adjacent symbols in a given transmission also have different bit patterns. In one or more embodiments, the patterns for the first transmission and the second transmission may be represented as:

$$\{p_1, p_2, \ldots, p_K\} \quad 1^{st} \text{ transmission}$$

$$\{p_1', p_2', \ldots, p_{(K-1)}'\} \quad 2^{nd} \text{ transmission.}$$

In general, the interlacing rule may result in a shift of the bit patterns from a first transmission to a next transmission. Such a shift in the bit pattern mapping may be represented by a constellation mapping rule for the ith transmission as:

$$\text{shift}(\{p_1, p_2, \ldots, p_K\}, i)$$

where K is the modulation order, although the scope of the claimed subject matter is not limited in this respect. A similar constellation rearrangement scheme for 64 QAM is shown in and described with respect to FIG. 4, below.

Figure 4:
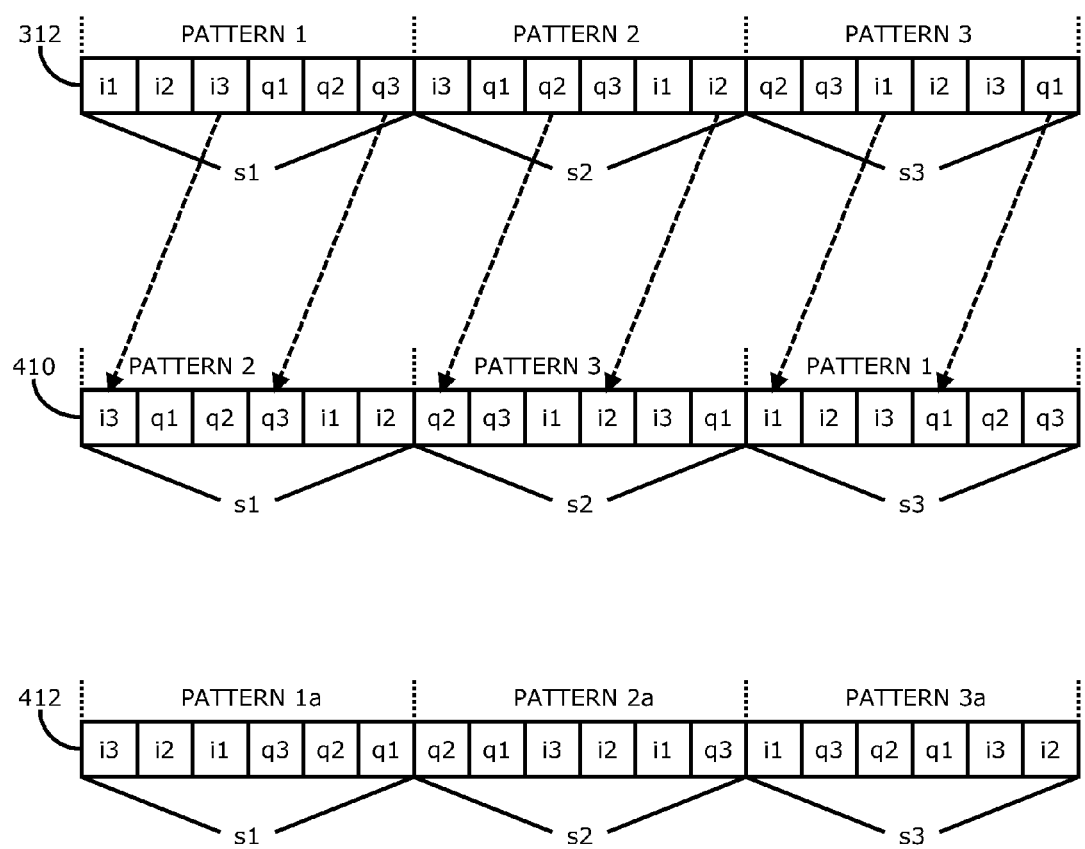
FIG. 4 is diagram of an interlaced constellation symbol scheme for 64 QAM HARQ retransmission in accordance with one or more embodiments.

Referring now to FIG. 4, a diagram of an interlaced symbol constellation scheme for 64 QAM HARQ retransmission in accordance with one or more embodiments will be discussed. The initial constellation 312 pattern is shown for 64 QAM. For optimum performance, extra constellation rearrangement patterns may be utilized, for example for the second transmission as shown in constellation 410. In one embodiment, by shifting the third, fourth, fifth, and sixth bits in a symbol to the previous position of the first, second, third, and fourth bits, and shifting the first and second bits to the right, what was the first pattern for symbol s1 in the initial transmission becomes the second pattern for symbol s1. Likewise, symbol s2 has pattern 3, and symbol s3 has pattern 1 in the second transmission as shown at constellation 412, which is a retransmission for HARQ transmission. Alternatively, constellation 414 shows another example constellation pattern for the second transmission wherein pattern 1 in constellation 312 changes to pattern 1a in constellation 414 for symbol s2. Likewise, pattern 2 changes to pattern 2a and pattern 3 changes to pattern 3a from constellation 312 to constellation 412 for symbol s2 and symbol s3, respectively. Thus, when implementing the symbol constellation rearrangement rules that adjacent symbols within a given transmission, including the initial transmission, have different bit patterns, and that the bit pattern for a given symbol changes from transmission to transmission, constellation rearrangement bit-grouping gain may be achieved. As a result, the performance of the initial transmission and subsequent transmissions may be increased without requiring additional complexity with channel coding circuit 100, which has been confirmed via simulation results. For example, initial transmission performance may be increased since the scheme described herein may avoid the contiguous bit being integrated into a same constellation layer. Furthermore, performance may be increased via constellation rearrangement for HARQ retransmissions. In addition, the same module may be utilized to perform bit grouping and HARQ constellation rearrangement in a given channel coding circuit 100. Implementation of the present scheme may also result in enhanced diversity gain. An example of how channel coding circuit implements such an interleaved symbol constellation rearrangement is shown in and described with respect to FIG. 5, below.

Figure 5:
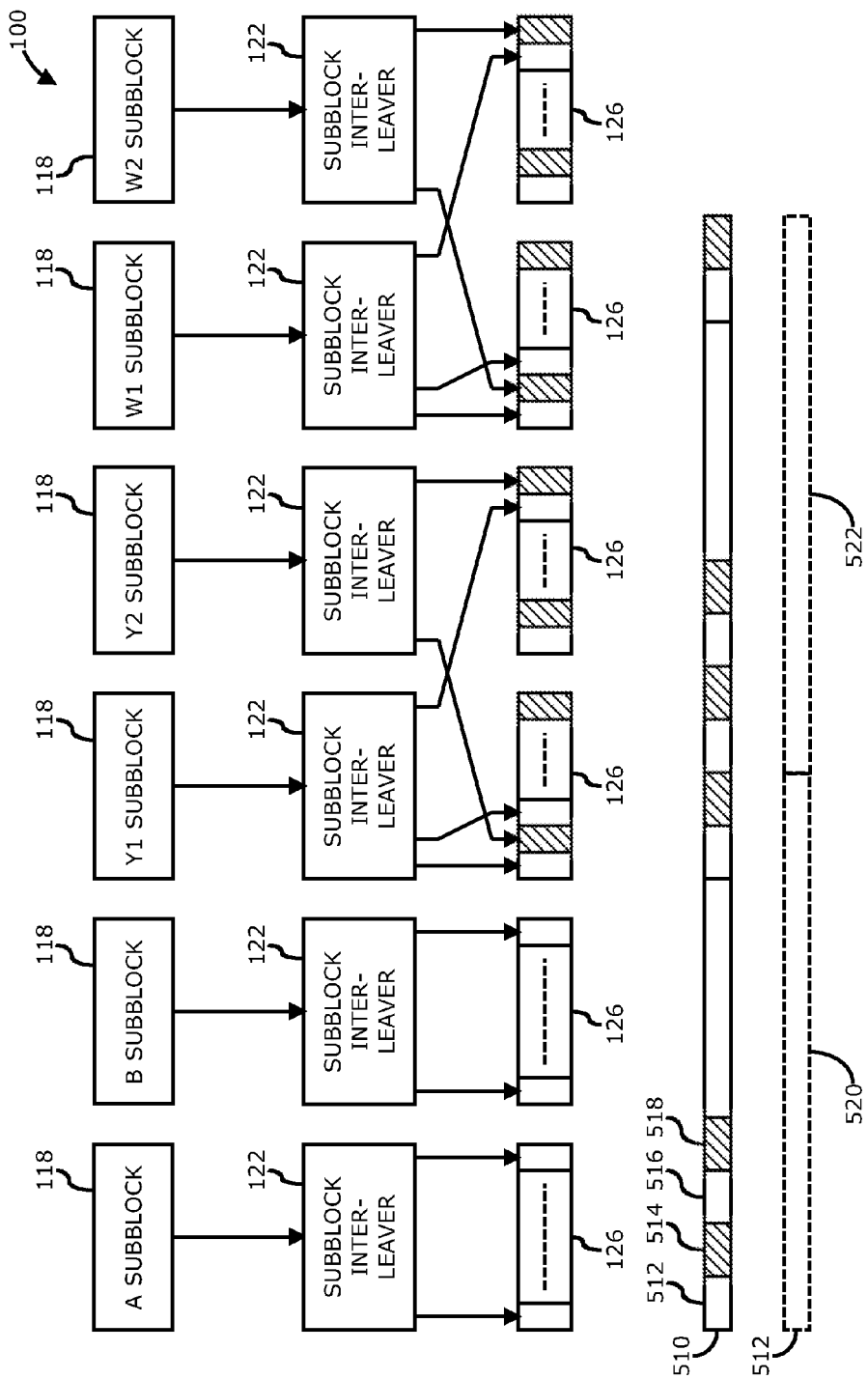
FIG. 5 is a block diagram of a constellation rearrangement circuit in accordance with one or more embodiments.

Referring now FIG. 5, a block diagram of a constellation rearrangement circuit in accordance with one or more embodiments will be discussed. As shown in FIG. 5, channel coding circuit 100 utilizes the subblock interleavers 122 to interleave the bits of the corresponding subblocks 118 into symbol arrangements 126 according to the interlaces symbol constellation scheme as described herein. For HARQ retransmissions, symbols 512, 514, 516, 518, and so one are arranged in a first retransmission 510 to have a bit pattern according to the rule that adjacent symbols have different bit patterns for the same transmission. Likewise, from transmission to transmission, for example from first retransmission 510 to second retransmission, the constellation pattern in the second retransmission may have a first part 520 that has the same pattern as in the constellation of the first transmission 510, but may have a second part 522 that is a different pattern that is different from the corresponding part of the constellation of the first retransmission 510. As a result, the second retransmission may follow the rule of the present constellation rearrangement scheme that the symbol constellation patterns in subsequent transmissions are different from the pattern of a previous transmission. It should be noted that the symbol constellation pattern changes from a first retransmission 510 to a second retransmission 512 may be extrapolated to any number of retransmissions in a HARQ transmission system, and furthermore other pattern changes may likewise be utilized in addition to the one shown in FIG. 5, and then scope of the claimed subject matter is not limited in this respect. An example flowchart of a method for interlaced symbol constellation rearrangement for HARQ transmission is shown in and described with respect to FIG. 6, below.

Figure 6:
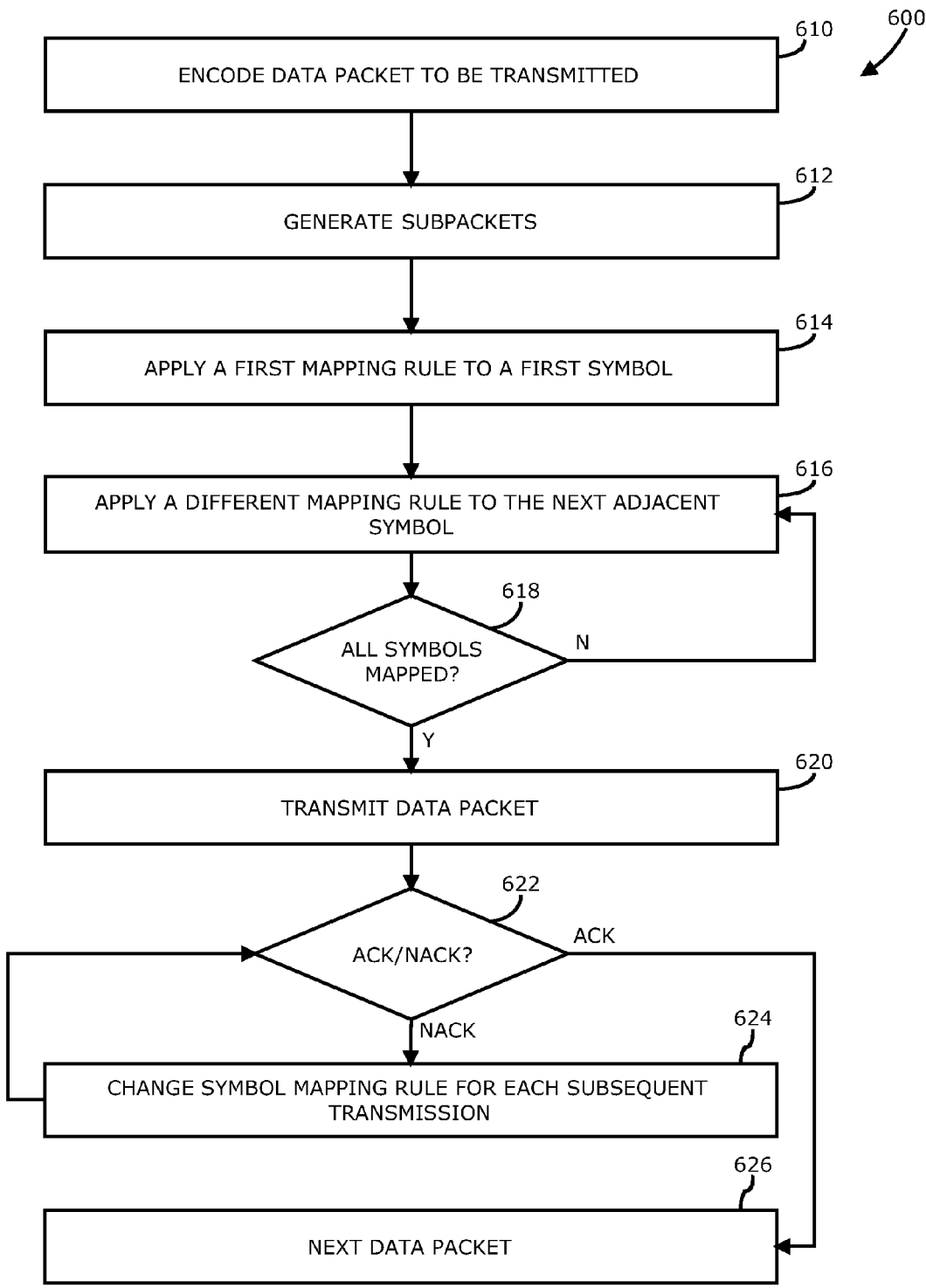
FIG. 6 is a flow diagram of a method for interlaced symbol constellation transmission in accordance with one or more embodiments.

Referring now to FIG. 6, a flow diagram of a method for interlaced symbol constellation rearrangement for HARQ transmission in accordance with one or more embodiments will be discussed. As shown in FIG. 6, method 600 illustrates one particular arrangement, however in alternative embodiments method 600 may include more or fewer blocks than shown, and/or a different ordering of the blocks, and the scope of the claimed subject matter is not limited in these respects. At block 610, a data packet to be transmitted is encoded, for example using a 1/3 CTC encoding scheme. One or more subpackets may be generated at block 612 from the encoded data by channel encoding circuit 100 of FIG. 1. A first mapping rule may be applied to a first symbol at block 614, and a different mapping rule may be applied to the next adjacent symbol at block 616 until all symbols in a constellation are mapped as determined by decision block 618. This arrangement the rule of the present scheme that adjacent symbols in a given transmission should have a different bit pattern as determined by the mapping rule. After all the symbols in a constellation are mapped, the data packet may be transmitted at block 620 to a receiving device which implements a HARQ process by feeding back either an acknowledgement (ACK) message or a negative acknowledgment (NACK) message. If the transmitting device receives a NACK message at block 622, the mapping rule may be shifted or otherwise changed or interleaved as discussed herein for each subsequent transmission at block 624 until an ACK message is received at block 622 or otherwise until a timeout or maximum number of retransmissions is reached. This arrangement satisfies the rule of the present scheme that different transmissions should have a different symbol constellation arrangement than a previous transmission. If an ACK message is received at block 622, then the next data packet to be transmitted may be processed at block 626, and method 600 may continue for the next data packet. It should be noted that method 600 is merely one example method for implementing a scheme for interlaced symbol constellation rearrangement among various other possible methods, and the scope of the claimed subject matter is not limited in this respect. An example diagram of a wireless network on which devices of the network may implement the present symbol constellation rearrangement scheme is shown in and described with respect to FIG. 7, below.

Figure 7:
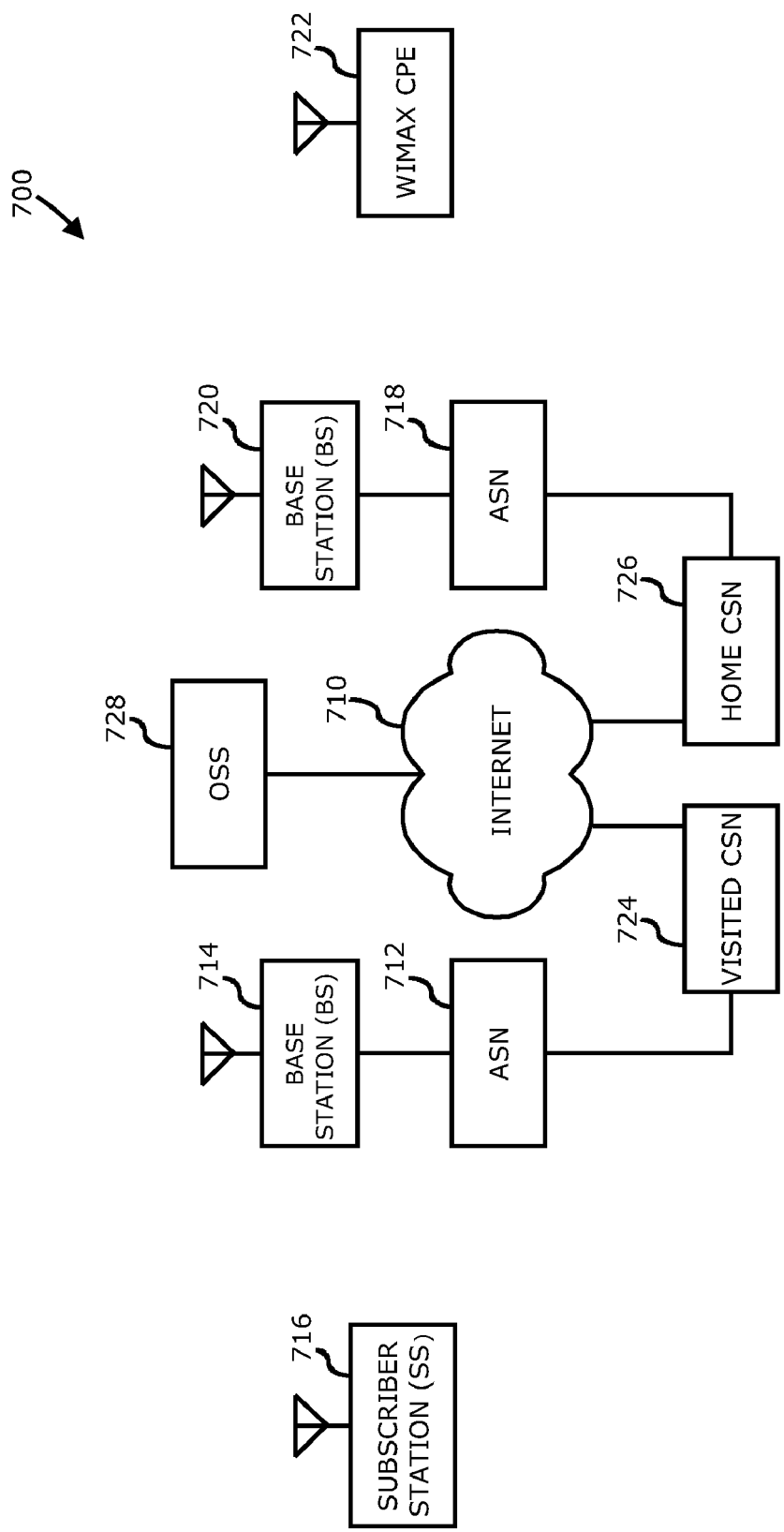
FIG. 7 is a block diagram of a wireless wide area network capable of utilizing interlaced symbol constellation transmission in accordance with one or more embodiments.

Referring now to FIG. 7, a block diagram of a wireless wide area network capable of utilizing interlaced symbol constellation rearrangement for HARQ transmission in accordance with one or more embodiments will be discussed. As shown in FIG. 7, network 700 may be an internet protocol (IP) type network comprising an internet 710 type network or the like that is capable of supporting mobile wireless access and/or fixed wireless access to internet 710. In one or more embodiments, network 700 may be in compliance with a Worldwide Interoperability for Microwave Access (WiMAX) standard or future generations of WiMAX, and in one particular embodiment may be in compliance with an Institute for Electrical and Electronics Engineers 802.16m standard (IEEE 802.16m). In one or more alternative embodiments network 700 may be in compliance with a Third Generation Partnership Project Long Term Evolution (3GPP LTE) or a 3GPP2 Air Interface Evolution (3GPP2 AIE) standard, and/or a Fourth Generation (4G) standard, or the like. In general, network 700 may comprise any type of orthogonal frequency division multiple access (OFDMA) based wireless network, and the scope of the claimed subject matter is not limited in these respects. As an example of mobile wireless access, access service network (ASN) 712 is capable of coupling with base station (BS) 714 to provide wireless communication between subscriber station (SS) 716 and internet 710. Subscriber station 116 may comprise a mobile type device or information handling system capable of wirelessly communicating via network 700, for example a notebook type computer, a cellular telephone, a personal digital assistant, or the like. ASN 712 may implement profiles that are capable of defining the mapping of network functions to one or more physical entities on network 700. Base station 714 may comprise radio equipment to provide radio-frequency (RF) communication with subscriber station 716, and may comprise, for example, the physical layer (PHY) and media access control (MAC) layer equipment in compliance with an IEEE 802.16m type standard. Base station 714 may further comprise an IP backplane to couple to internet 710 via ASN 712, although the scope of the claimed subject matter is not limited in these respects.

Network 700 may further comprise a visited connectivity service network (CSN) 724 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VOIP) gateways, and/or internet protocol (IP) type server functions, or the like. However, these are merely example of the types of functions that are capable of being provided by visited CSN or home CSN 726, and the scope of the claimed subject matter is not limited in these respects. Visited CSN 724 may be referred to as a visited CSN in the case for example where visited CSN 724 is not part of the regular service provider of subscriber station 716, for example where subscriber station 716 is roaming away from its home CSN such as home CSN 726, or for example where network 700 is part of the regular service provider of subscriber station but where network 700 may be in another location or state that is not the main or home location of subscriber station 716. In a fixed wireless arrangement, WiMAX type customer premises equipment (CPE) 722 may be located in a home or business to provide home or business customer broadband access to internet 710 via base station 720, ASN 718, and home CSN 726 in a manner similar to access by subscriber station 716 via base station 714, ASN 712, and visited CSN 724, a difference being that WiMAX CPE 722 is generally disposed in a stationary location, although it may be moved to different locations as needed, whereas subscriber station may be utilized at one or more locations if subscriber station 716 is within range of base station 714 for example. In accordance with one or more embodiments, operation support system (OSS) 728 may be part of network 700 to provide management functions for network 100 and to provide interfaces between functional entities of network 700. Network 700 of FIG. 7 is merely one type of wireless network showing a certain number of the components of network 700, however the scope of the claimed subject matter is not limited in these respects.

Figure 8:
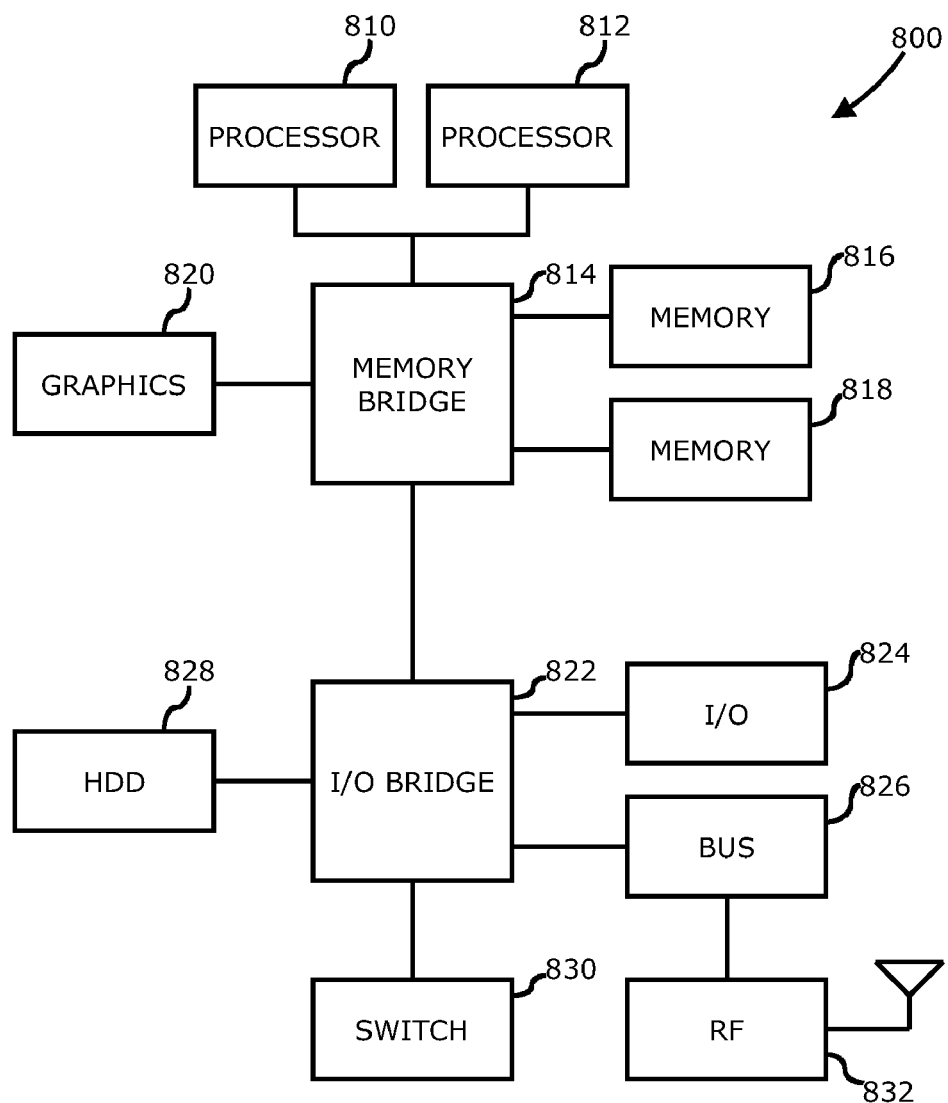
FIG. 8 is a block diagram of an information handling system capable of utilizing interlaced symbol constellation transmission in accordance with one or more embodiments.

Referring now to FIG. 8, a block diagram of an information handling system capable of utilizing interlaced symbol constellation rearrangement for HARQ transmission in accordance with one or more embodiments will be discussed. Information handling system 800 of FIG. 8 may tangibly embody one or more of any of the network elements of network 700 as shown in and described with respect to FIG. 7. For example, information handling system 800 may represent the hardware of base station 714 and/or subscriber station 716, with greater or fewer components depending on the hardware specifications of the particular device or network element. Although information handling system 800 represents one example of several types of computing platforms, information handling system 800 may include more or fewer elements and/or different arrangements of elements than shown in FIG. 8, and the scope of the claimed subject matter is not limited in these respects.

Information handling system 800 may comprise one or more processors such as processor 810 and/or processor 812, which may comprise one or more processing cores. One or more of processor 810 and/or processor 812 may couple to one or more memories 816 and/or 818 via memory bridge 814, which may be disposed external to processors 810 and/or 812, or alternatively at least partially disposed within one or more of processors 810 and/or 812. Memory 816 and/or memory 818 may comprise various types of semiconductor based memory, for example volatile type memory and/or non-volatile type memory. Memory bridge 814 may couple to a graphics system 820 to drive a display device (not shown) coupled to information handling system 800.

Information handling system 800 may further comprise input/output (I/O) bridge 822 to couple to various types of I/O systems. I/O system 824 may comprise, for example, a universal serial bus (USB) type system, an IEEE 1394 type system, or the like, to couple one or more peripheral devices to information handling system 800. Bus system 826 may comprise one or more bus systems such as a peripheral component interconnect (PCI) express type bus or the like, to connect one or more peripheral devices to information handling system 800. A hard disk drive (HDD) controller system 828 may couple one or more hard disk drives or the like to information handling system, for example Serial ATA type drives or the like, or alternatively a semiconductor based drive comprising flash memory, phase change, and/or chalcogenide type memory or the like. Switch 830 may be utilized to couple one or more switched devices to I/O bridge 822, for example Gigabit Ethernet type devices or the like. Furthermore, as shown in FIG. 8, information handling system 800 may include a radio-frequency (RF) block 832 comprising RF circuits and devices for wireless communication with other wireless communication devices and/or via wireless networks such as network 800 of FIG. 8, for example where information handling system 800 embodies base station 814 and/or subscriber station 816, although the scope of the claimed subject matter is not limited in this respect. In one or more embodiments, RF block 832 may comprise a radio-frequency transceiver, and baseband processing of received and transmitted signal may be performed by processor 810 and/or processor 812, for example processing of baseband and/or quadrature signals, although the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to interlaced symbol constellation mapping for wireless communication and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
   encoding a data packet to be transmitted;
   generating one or more subpackets from the encoded data packet;
   applying a first bit pattern to a first symbol of the one or more subpackets to provide a constellation;
   applying a different bit pattern to a next adjacent symbol in the constellation for one or more additional symbols in the constellation; and
   transmitting the data packet modulated according to the constellation one or more times until the data packet is decoded by a receiver or until said transmitting is aborted.

2. A method as claimed in claim 1, further comprising, if said transmitting is executed two or more times, arranging the symbols of the constellation in a different bit pattern for one or more of the symbols for one or more subsequent transmissions of the data packet.

3. A method as claimed in claim 1, further comprising, if said transmitting is executed two or more times, shifting the bit pattern for the symbols of the constellation for one or more of the symbols for one or more subsequent transmissions of the data packet.

4. A method as claimed in claim 1, further comprising, for an ith transmission, applying a constellation mapping rule to the symbols of the constellation to apply a bit pattern to a corresponding symbol as:

$$\text{shift}(\{p_1, p_2, \ldots, p_K\}, i)$$

wherein K is a modulation order and $p_n$ represents a bit pattern applied to an nth symbol of the constellation.

5. A method as claimed in claim 1, wherein said transmitting is executed a number of times based at least in part on on a hybrid automatic repeat request error control technique.

6. A method as claimed in claim 1, wherein said encoding comprises encoding the data packet with a convolutional turbo code.

7. A method as claimed in claim 1, wherein a continuous bit in an initial iteration of said transmitting is mapped to a different constellation layer in a subsequent iteration of said transmitting.

8. An apparatus, comprising:
   an encoder to encode a data packet to be transmitted;

a subpacket generation circuit to generate one or more subpackets from the encoded data packet and to arrange the subpackets into a constellation of symbols for transmission, wherein the subpacket generation circuit is configured to:
apply a first bit pattern to a first symbol of the one or more subpackets to provide the constellation; and
apply a different bit pattern to a next adjacent symbol in the constellation for one or more additional symbols in the constellation; and
a transmitter to transmit the data packet modulated according to the constellation one or more times until the data packet is decoded by a receiver or until said transmitting is aborted.

9. An apparatus as claimed in claim 8, the subpacket generation circuit being further configured to, if the transmits the data packet two or more times, arrange the symbols of the constellation in a different bit pattern for one or more of the symbols for one or more subsequent transmissions of the data packet.

10. An apparatus as claimed in claim 8, the subpacket generation circuit being further configured to, if said transmitting is executed two or more times, shift the bit pattern for the symbols of the constellation for one or more of the symbols for one or more subsequent transmissions of the data packet.

11. An apparatus as claimed in claim 8, the subpacket generation circuit being further configured to, for an ith transmission, apply a constellation mapping rule to the symbols of the constellation to apply a bit pattern to a corresponding symbol as:

$$\text{shift}(\{p_1, p_2, \ldots, p_K\}, i)$$

wherein K is a modulation order and $p_n$ represents a bit pattern applied to an nth symbol of the constellation.

12. An apparatus as claimed in claim 8, wherein the transmitter transmits the data packet a number of times based at least in part on a hybrid automatic repeat request error control technique.

13. An apparatus as claimed in claim 8, wherein the encoder encodes the data packet with a convolutional turbo code.

14. An apparatus as claimed in claim 8, the subpacket generation circuit being further configured to map a continuous bit in an initial transmission to a different constellation layer in a subsequent transmission.

15. A method, comprising:
encoding a data packet to be transmitted;
generating one or more subpackets from the encoded data packet;
applying a first bit pattern to a first symbol of the one or more subpackets to provide a constellation;
applying a different bit pattern to a next adjacent symbol in the constellation for one or more additional symbols in the constellation;
transmitting the data packet modulated according to the constellation; and
if a negative acknowledgment is received in response to said transmitting, rearranging one or more of the symbols of the constellation in a different bit pattern; and
retransmitting the data packet using the different bit patterns of the rearranged symbols.

16. A method as claimed in claim 15, wherein said rearranging comprises shifting the bit pattern for the symbols of the constellation for one or more of the symbols for one or iterations of said retransmitting.

17. A method as claimed in claim 15, further comprising, for an ith transmission, applying a constellation mapping rule to the symbols of the constellation to apply a bit pattern to a corresponding symbol as:

$$\text{shift}(\{p_1, p_2, \ldots, p_K\}, i)$$

wherein K is a modulation order and $p_n$ represents a bit pattern applied to an nth symbol of the constellation.

18. A method as claimed in claim 15, wherein said encoding comprises encoding the data packet with a convolutional turbo code.

19. A method as claimed in claim 15, wherein a continuous bit in an initial iteration of said transmitting is mapped to a different constellation layer in said retransmitting.

20. A method as claimed in claim 15, further comprising executing said retransmitting one or more times and executing said rearranging one or more times to provide a different arrangement of one or more of the symbols of the constellation in a different bit pattern for one or more retransmissions of the data packet.

* * * * *

UNITED STATES PATENT AND TRADEMARK OFFICE
CERTIFICATE OF CORRECTION

PATENT NO. : 8,325,833 B2
APPLICATION NO. : 12/642936
DATED : December 4, 2012
INVENTOR(S) : Rui Huang et al.

Page 1 of 1

It is certified that error appears in the above-identified patent and that said Letters Patent is hereby corrected as shown below:

On the first page, in field (75), in column 1, in "Inventors", line 2, delete "IL (US)" and insert -- IL --, therefor.

In column 8, line 57, in claim 5, delete "part on on" and insert -- part on --, therefor.

Signed and Sealed this
Fifth Day of February, 2013

Teresa Stanek Rea
*Acting Director of the United States Patent and Trademark Office*